K. SMITH.
COMPASS ALTIMETER.
APPLICATION FILED DEC. 15, 1916.
1,257,645.
Patented Feb. 26, 1918.
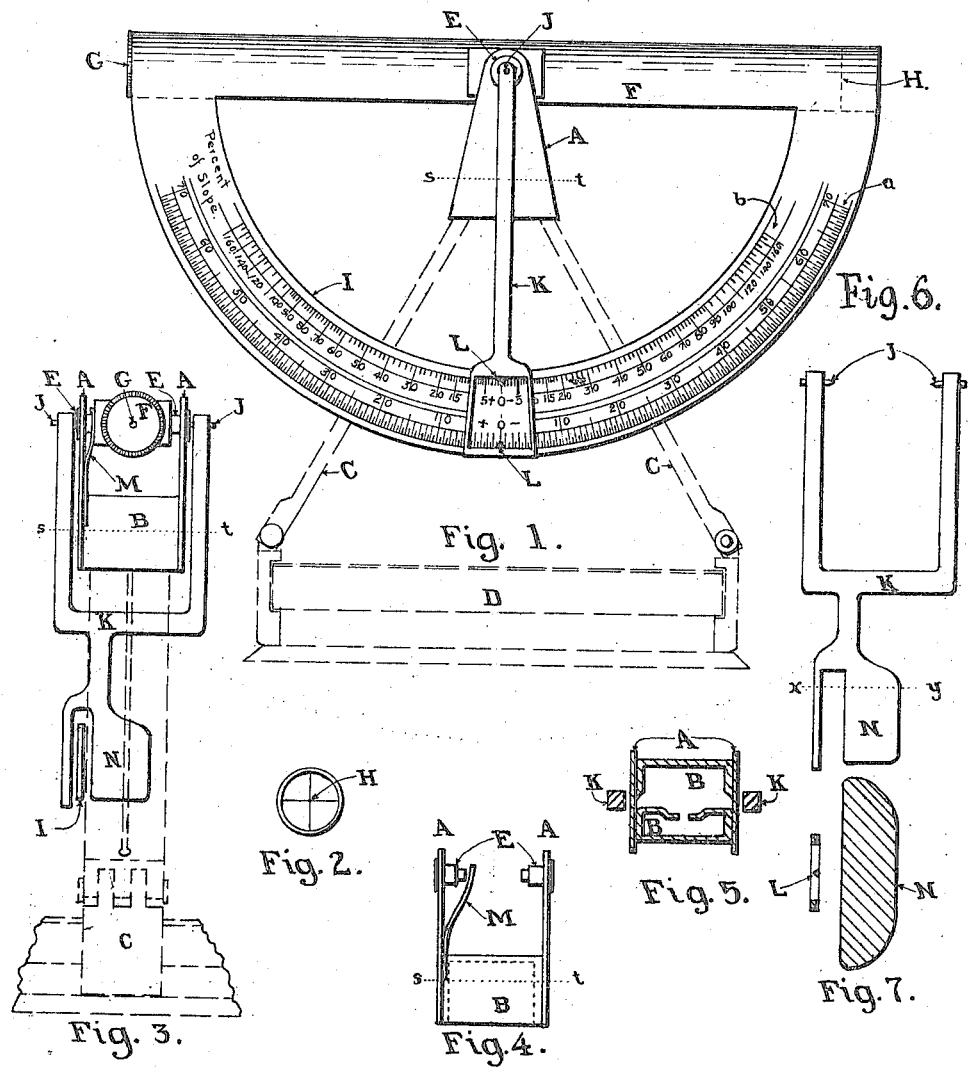

UNITED STATES PATENT OFFICE.

KAN SMITH, OF PORTLAND, OREGON.

COMPASS-ALTIMETER.

1,257,645.

Specification of Letters Patent.   Patented Feb. 26, 1918.

Application filed December 15, 1916.   Serial No. 137,278.

(DEDICATED TO THE PUBLIC.)

*To all whom it may concern:*

Be it known that I, KAN SMITH, a citizen of the United States of America, and an employee of the Department of Agriculture of the said United States, residing at Portland, Oregon, (whose post-office address is c/o 429 Beck Building, Portland, Oregon,) have invented a new and useful Improvement in Compass-Altimeters.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

My invention relates to a compass altimeter. The object of my invention is to provide an instrument for disclosing readings of vertical angles in connection with a compass in ordinary and topographic surveys, and which at the same time is inexpensive and simple in construction, and which combines sights for azimuth and vertical angles. The instrument comprising my invention is designed to be used attached to a standard compass, supported on a Jacob staff, tripod or traverse board. By slight change in construction it could be adapted for use with any compass having long sight vanes of equal length that will meet in an acute angle above the compass box, or with a sight alidade with similar sight vanes. No alteration of the compass parts is required so that by removing the attachment the compass is ready for instant use in the ordinary way. There are no detachable parts to become misplaced or lost. With ordinary care there are no adjustments required and by simpleness of construction none to be made. Its movements are independent of the compass and, therefore, will operate regardless of the levelness of the latter within not unreasonable limits.

My invention consists in the combination and arrangement of parts, as will be hereinafter more fully described, shown in the accompanying drawings, wherein, Figure 1 is a side elevation of the instrument;

Fig. 2 is a plan view of cross hairs used in the sight tube;

Fig. 3 is a rear view of instrument;

Fig. 4 is a rear view of standards, socket, etc.;

Fig. 5 is a detailed sectional view of standards, sockets, etc.;

Fig. 6 is view of pendulum;

Fig. 7 is sectional view of pendulum weight, etc.

Referring to the drawings, A represents a pair of standards with socket, B, at their bottom for receiving the sight vanes, C, of compass, D, and, by trunnions, E, supporting a sight tube, F. This tube has a pinhole peep-sight, G, at one end and cross hairs, H, at the other end. This tube has on one side a vertical arc, I, of 180° with center coincident with the center of the tube, F, and has a vertical motion of approximately 120°. The arc, I, may be graduated as desired or preferably is graduated by one-half degrees both ways from 0° to 65°, as shown at $a$ Fig. 1, and also has a separate scale of graduations in percentages of slope both ways from 0% to 175%, as shown at $b$ Fig. 1. Supported by small pivots, J, in the outer ends of the trunnions, E, is a forked pendulum, K, swinging free over the face of the vertical arc, I, and having at its lower extremity a pair of indices, L, registering on the graduations referred to. A tension spring, M, is attached to one of the standards, A, to hold the tube, F, in a firm but movable position. The pendulum, K, also has a weight or plumb-bob, N, to improve steadiness and counteract disturbances by wind. This weight, N, is suspended between the sight vanes, C, and in rear of the vertical arc, I, and has sufficient clearance to avoid all friction with the latter and interference by the sight vanes, C. The line of sight through the tube, F, is parallel to the line of sight of the compass vanes, C, and to the edges of the square compass base, so that when using the instrument a sight is taken through the sight tube only, with the cross hairs, H, centering on the object. The azimuth is then read from the compass needle in the usual manner and the vertical angle is read direct from the vertical arc as with a transit. The compass with the altimeter may be used as an alidade in the usual way.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus described my invention, I claim:

A compass altimeter attachment, comprising a supporting member provided with sockets adapted to receive the sight vanes of a surveying instrument, a sighting device pivotally mounted on said member and having a graduated vertical arc extending therefrom, an indicator pivotally connected to said standard and movable over said arc, and a device for frictionally clamping said arc and indicator with respect to each other.

In testimony whereof, I affix my signature in the presence of two subscribing witnesses.

KAN SMITH.

Witnesses:
R. H. ROBERTSON,
CHAS. J. KRAEBEL.

Copies of this patent may be obtained for five cents each, by addressing the "Commissioner of Patents, Washington, D. C."